US 6,564,751 B2

(12) United States Patent
Anderson et al.

(10) Patent No.: US 6,564,751 B2
(45) Date of Patent: May 20, 2003

(54) TURKEY LOADER

(75) Inventors: Calvin J. Anderson, Paynesville, MN (US); Mark D. Yungerberg, Willmar, MN (US); Corey J. Stratton, Rock Rapids, IA (US); James M. Stratton, Luverne, MN (US)

(73) Assignee: Hormel Foods Corporation, Austin, MN (US)

( * ) Notice: Subject to any disclaimer, the term of this patent is extended or adjusted under 35 U.S.C. 154(b) by 0 days.

(21) Appl. No.: 09/871,603

(22) Filed: May 31, 2001

(65) Prior Publication Data
US 2002/0179024 A1 Dec. 5, 2002

(51) Int. Cl.[7] .............................................. A01K 29/00
(52) U.S. Cl. ........................................................ 119/845
(58) Field of Search ................................... 119/843–846

(56) References Cited

U.S. PATENT DOCUMENTS

| | | | |
|---|---|---|---|
| 3,272,182 A | 9/1966 | Lund ............................ 119/82 |
| 3,420,211 A | 1/1969 | Hartvickson ................. 119/82 |
| 3,470,852 A | 10/1969 | Bright .......................... 119/82 |
| 3,602,198 A | * 8/1971 | Tachett |
| 3,722,477 A | * 3/1973 | Weley et al. |
| 3,958,536 A | 5/1976 | Crowder ....................... 119/82 |
| 4,037,565 A | * 7/1977 | Ledwell, Jr. |
| 4,365,591 A | 12/1982 | Wills et al. .................... 119/82 |
| 4,567,852 A | * 2/1986 | Ledwell, Jr. |
| 4,600,351 A | * 7/1986 | Nelson |
| 4,766,850 A | * 8/1988 | O'Neil |
| 5,325,820 A | * 7/1994 | Briggs et al. ................ 119/846 |
| 5,385,117 A | * 1/1995 | Hollis et al. ................. 119/846 |
| 5,699,755 A | 12/1997 | Wills et al. .................. 119/846 |
| 5,706,765 A | * 1/1998 | Horton ........................ 119/846 |
| 5,743,217 A | * 4/1998 | Jerome ........................ 119/846 |
| 5,902,089 A | 5/1999 | Sinn et al. ................... 414/398 |
| 5,915,338 A | * 6/1999 | Fitzsimmons et al. ...... 119/846 |
| 5,975,029 A | * 11/1999 | Morimoto et al. .......... 119/843 |
| 6,305,327 B1 | * 10/2001 | Bounds, Jr. ................. 119/713 |

FOREIGN PATENT DOCUMENTS

WO    WO 94/08451    4/1994    ................ 119/845

* cited by examiner

Primary Examiner—Thomas Price
(74) Attorney, Agent, or Firm—IPLM Group, P.A.

(57) ABSTRACT

A turkey loading apparatus (10) includes a transport conveyor (30) and a loading conveyor (50). The loading conveyor (50) is positioned underneath the transport conveyor (30) and moves from a retracted position to an extended position. The transport conveyor has a first segment (32) pivotally connected to a second segment (33). As the loading apparatus (10) is raised and lowered, the first segment (32) pivots with respect to the second segment (33). In addition, the first segment (32) moves laterally.

25 Claims, 12 Drawing Sheets

TURKEY LOADER

BACKGROUND OF THE INVENTION

1. Field of the Invention

This invention relates generally to a turkey loader apparatus and more particularly to a method and apparatus for loading turkeys into coops which are carried on trailers.

2. Description of the Prior Art

Turkey loading has typically been a very labor intensive process. The usual method of loading turkeys involves having a conveyor convey the turkeys up to a platform. There, workers will stand at the end of the conveyor on a cat walk and grab the turkeys and stuff them into the coops on a trailer. Once that coop is filled, the height of the conveyor may be adjusted to fill the other coops which are positioned on top of the first coop. Then, once all those coops are filled, the trailer is moved and the remaining coops on the first side of the trailer are filled in the same manner. It is then necessary that the trailer be reversed and the coops on the other side of the trailer are similarly filled. It is not possible to load from one side of the trailer because the workers that are grabbing the turkeys at the top of the conveyors are not able to place or throw the turkeys a distance of up to eight feet, the typical width of a trailer.

The handling of the turkeys by the workers also give rise to bruises on the turkeys as they are being stuffed into the coops. Less handling by humans would reduce the trauma to which the turkeys are subjected.

The problems associated with loading turkeys have increased in recent years as the size of tom turkeys have increased to the 35–40 pound range or higher. The increased weight of the turkeys not only gives rise to more trauma to the turkeys as they are loaded, there are also high injury rates to workers performing this task. In addition to a task which exposes the workers to possible injury, the task of loading a trailer of 1,100 turkeys typically takes a four-man crew about 45–50 minutes to load. This is quite costly as not only does it involve four workers to load the turkeys, these four workers must then ride to another location to load the next load of turkeys, thereby creating travel time for four workers.

U.S. Pat. No. 5,915,338 discloses an improved turkey loader apparatus which loads the turkeys into a loading box. The loading box is moveable between a first and second position, wherein the second position is inside of the coop, thereby greatly easing the task of loading turkeys into a coop.

Other methods for loading turkeys have also been devised such as using a conveyor which extends in length. Such serpentine conveyors that extend in length are difficult to construct and maintain.

The present invention addresses the problems associated with the prior art devices and provides for a method and apparatus for automatically loading turkeys and utilizes a loader that has a constant length loading conveyor that extends into and out of the coops on a trailer.

SUMMARY OF THE INVENTION

In one embodiment, the present invention is a turkey loading apparatus for loading turkeys into a coop on a trailer. The coop forms an enclosure for the turkeys. The turkey loading apparatus includes a base having a first end and a second end. A transport conveyor is operatively supported by the base. The transport conveyor has a gathering end and a transfer end. A lifting mechanism is operatively connected to the base proximate the second end of the base. A longitudinal rail is operatively connected to the lift mechanism, wherein the rail is moveable vertically. The transfer end of the transport conveyor is supported by and longitudinally moveable on the rail and the transport conveyor, proximate the gathering end, is operatively connected to and supported by the base. The transport conveyor has a first segment pivotally connected to a second segment, wherein when the longitudinal rail is lifted, the first segment pivots relative to the second segment and the transfer end moves longitudinally on the rail. A loading conveyor is operatively connected to the longitudinal rail and positioned below the transport conveyor. The loading conveyor is moveable between a retracted position and an extended position, wherein turkeys are moved on the transport conveyor and dropped on to the loading conveyor, the loading conveyor being moved to its extended position and run to deposit the turkeys into the coop as the loading conveyor is being retracted.

In another embodiment, the invention is a turkey loading apparatus for loading turkeys into a coop on a trailer. The coop forms an enclosure for the turkeys. The turkey loading apparatus includes a base having a first end and a second end. A transport conveyor is operatively supported by the base. The transport conveyor has a gathering end and a transfer end. A lifting mechanism is operatively connected to the base proximate the second end of the base. A longitudinal rail is operatively connected to the lift mechanism, wherein the rail is moveable vertically. The transfer end of the transport conveyor is supported by and longitudinally moveable on the rail and the transport conveyor, proximate the gathering end, is operatively connected to and supported by the base. A loading conveyor is operatively connected to the longitudinal rail and positioned below the transport conveyor. The loading conveyor has a fixed length and is moveable between a retracted position and an extended position, when in the retracted position, there is at least four feet of the loading conveyor under the transport conveyor, wherein turkeys are moved on the transfer conveyor and dropped on to the loading conveyor. The loading conveyor being moved to its extended position and run to deposit the turkeys into the coop as the loading conveyor is being retracted.

In another embodiment, the invention is a turkey loading apparatus for loading turkeys into a coop on a trailer. The coop forms an enclosure for the turkeys. The turkey loading apparatus includes a base having a first end and a second end. A transport conveyor is operatively supported by the base. The transport conveyor has a gathering end and a transfer end. A lifting mechanism is operatively connected to the base proximate the second end of the base. A longitudinal rail is operatively connected to the lift mechanism, wherein the rail is moveable vertically. The transfer end of the transport conveyor is supported by and longitudinally moveable on the rail and the transport conveyor, proximate the gathering end, is operatively connected to and supported by the base. The transport conveyor has a first segment pivotally connected to the second segment, wherein when the longitudinal rail is lifted, the first segment pivots relative to the second segment and the transfer end moves longitudinally on the rail. A loading conveyor is operatively connected to the longitudinal rail and positioned between the transport conveyor. The loading conveyor has a fixed length and is moveable between a retracted position and an extended position. When in the retracted position, there is at least four feet of the loading conveyor under the transport conveyor, wherein the turkeys are moved on the transport conveyor and dropped on to the loading conveyor. The loading conveyor being moved to its extended position and run to deposit the turkeys into the coop as the loading conveyor is being retracted.

In another embodiment, the invention is a method of loading turkeys. The method includes herding turkeys on to a transport conveyor and conveying the turkeys on the transport conveyor. Turkeys are then dropped from the transport conveyor on to a loading conveyor positioned below the transport conveyor. The loading conveyor is then moved into the coop on a trailer and the turkeys are conveyed off the forward end of the loading conveyor as the loading conveyor is being retracted.

DETAILED DESCRIPTION OF THE PREFERRED EMBODIMENT

Figure 1:
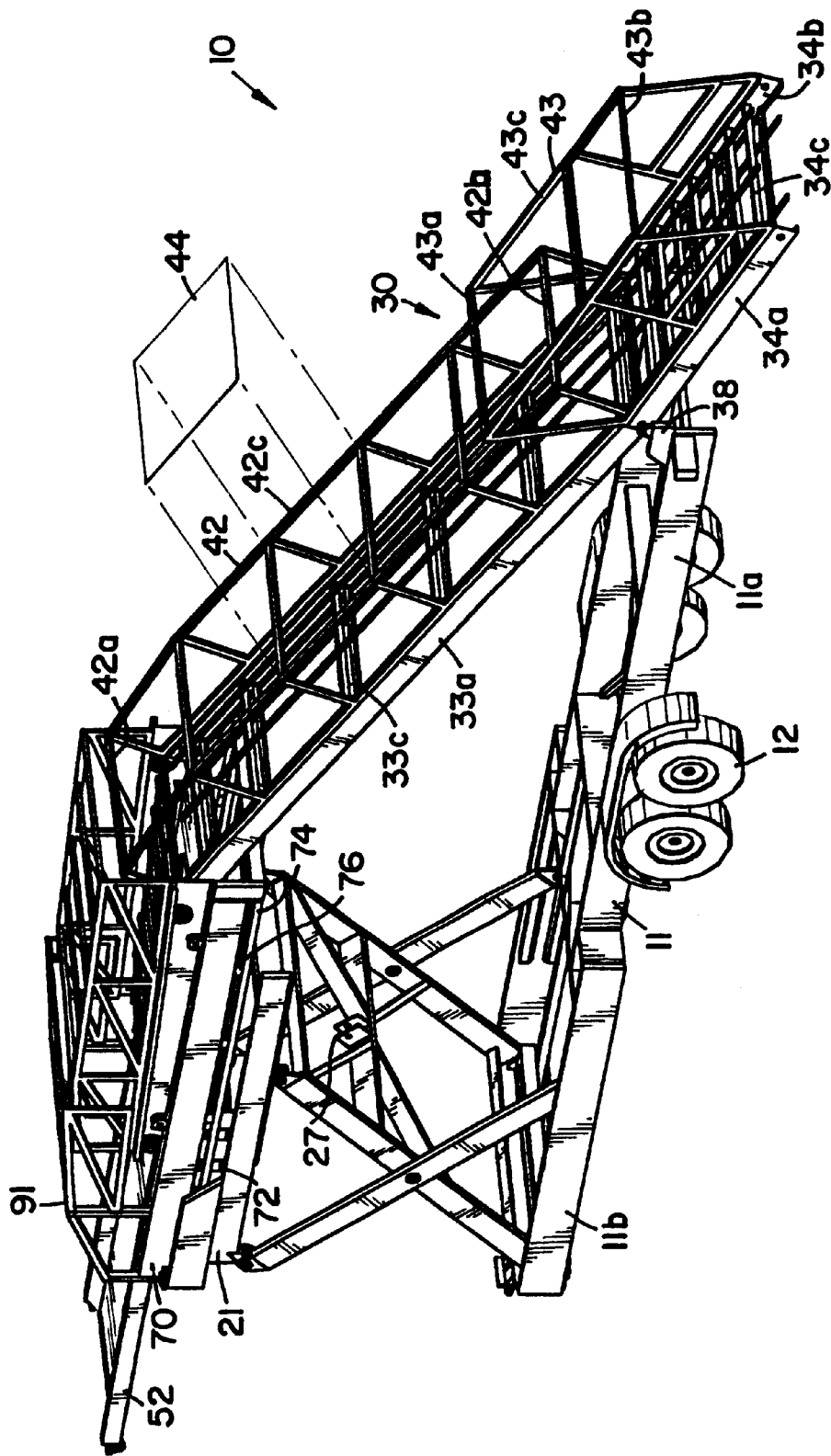
FIG. 1 is a perspective view, viewed generally from behind, with several parts removed for clarity, of the turkey loading apparatus of the present invention.

Referring to the drawing, wherein like parts represent like parts throughout the several views, there is generally disclosed at 10 a turkey loading apparatus. It should be noted that in several of the views, some of the components of the turkey loading apparatus 10 have been removed for clarity purposes, such as the rail 70. The rail 70 is shown in FIG. 1 but has been removed in FIGS. 2–5, 11 and 12. Another example is that in several views, hydraulic cylinders are not shown. However, the figures as a whole clearly show the entire turkey loading apparatus of the present invention.

Figure 11:
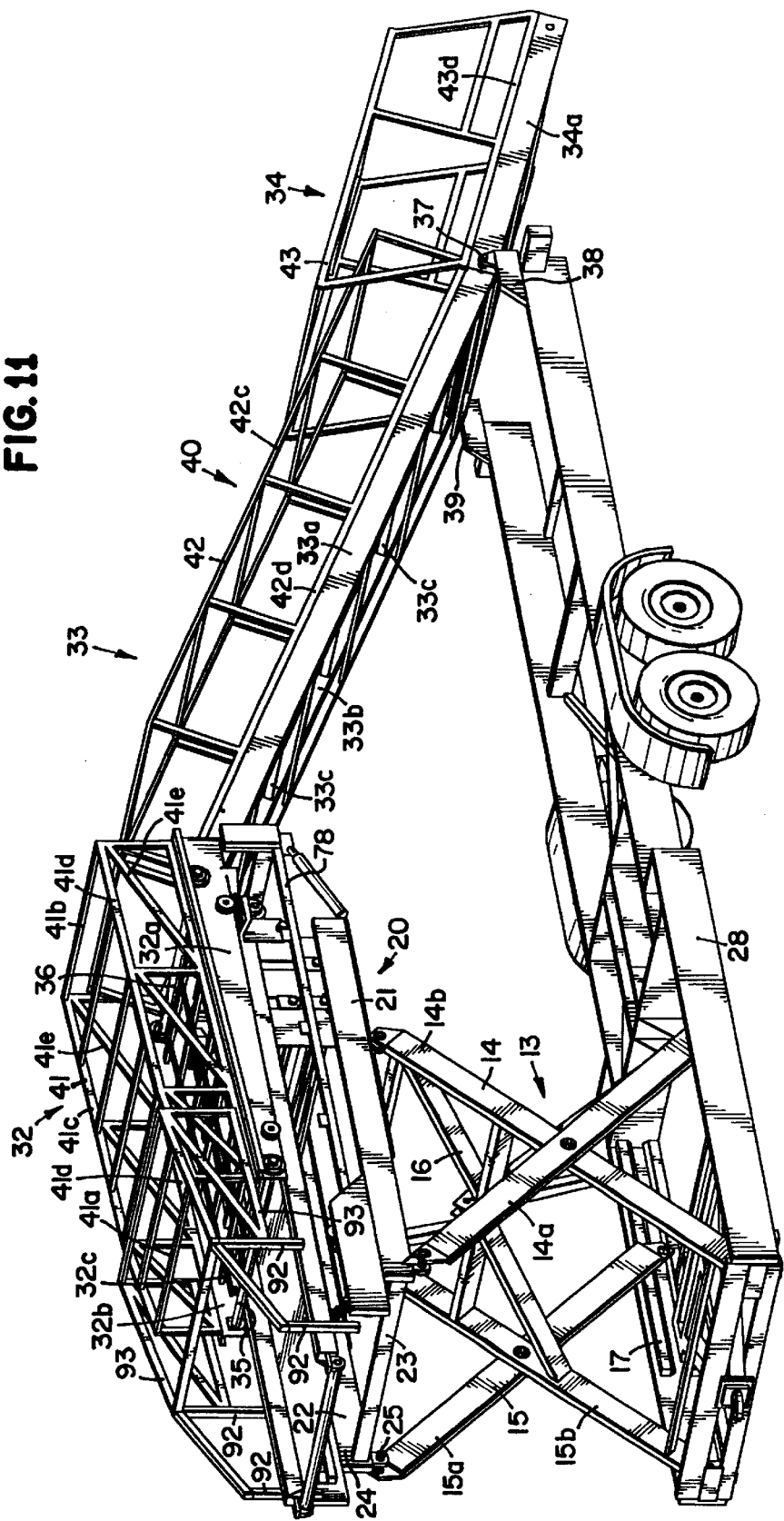
FIG. 11 is a perspective view of the loading apparatus shown in FIG. 1, viewed generally from the front.

The turkey loading apparatus includes a base 11 that has a first end 11a proximate a gathering end and a second end 11b proximate the transfer end. The base 11 may be any suitable frame structure such as that shown in FIG. 1. The base 11 is operatively connected to four wheels 12, by means well known in the art, to form a transportable base for moving the turkey loading apparatus 10. The turkey loading apparatus 10 also includes a lifting mechanism, generally designated at 13. The lifting mechanism includes a left cross frame 14 having a first member 14a pivotally connected to a second member 14b. The lifting mechanism is not shown in FIGS. 4 and 5. A right cross frame 15 includes a first member 15a pivotally mounted to a second member 15b. Suitable cross bracing 16 may be utilized to strengthen the lifting mechanism 13. The bottoms of the second members 14b, 15b are secured to the base 11 and the bottoms of the first members 14a, 15a are slidably secured to the base 11 in a track 17. A base member 20 includes a left member 21 and a right member 22 with cross members 23 being operatively connected between the left member 21 and the right member 22 by suitable means such as welding. The base is operatively connected to the tops of the cross frames 14, 15 by suitable means well known in the art. One method of doing so is shown in FIG. 11 and includes mounting flanges 24 welded to the left member 21 and right member 22. Then, pins 25 are positioned through the cross frames 14, 15 into the mounting flanges 24 to secure the base 10. The rear mounting flanges are mounted in a track, similar to track 17, to allow for sliding of the top portions of the members 14b, 15b in the track (not shown), which is similar to track 17. A hydraulic cylinder 26, which has been removed from FIG. 1 for clarity, has a first end mounted between a yoke 27 at its top end and a yoke at the bottom end. The yoke 28 is welded to the base 11 and the yoke 27 is welded to the cross bracing 16. Actuation of the hydraulic cylinder 26 will cause the base 20 to raise and lower as the cross frames 14, 15 are moved in the track 17. The lifting mechanism 13 is a scissors lifting mechanism, which is well known in the art. It is understood that other suitable lifting mechanisms could also be used to raise and lower the base 20.

Figure 10:
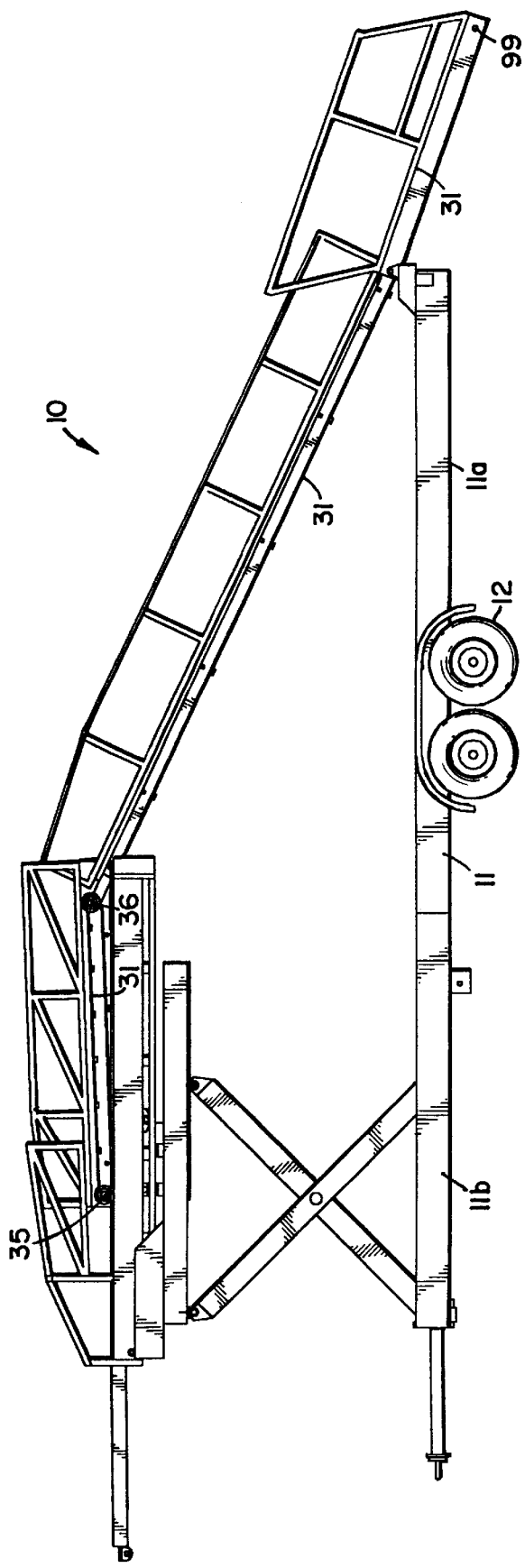
FIG. 10 is a side elevational view of the loading apparatus shown in FIG. 1 showing the configuration of the transport conveyor.
Figure 13:
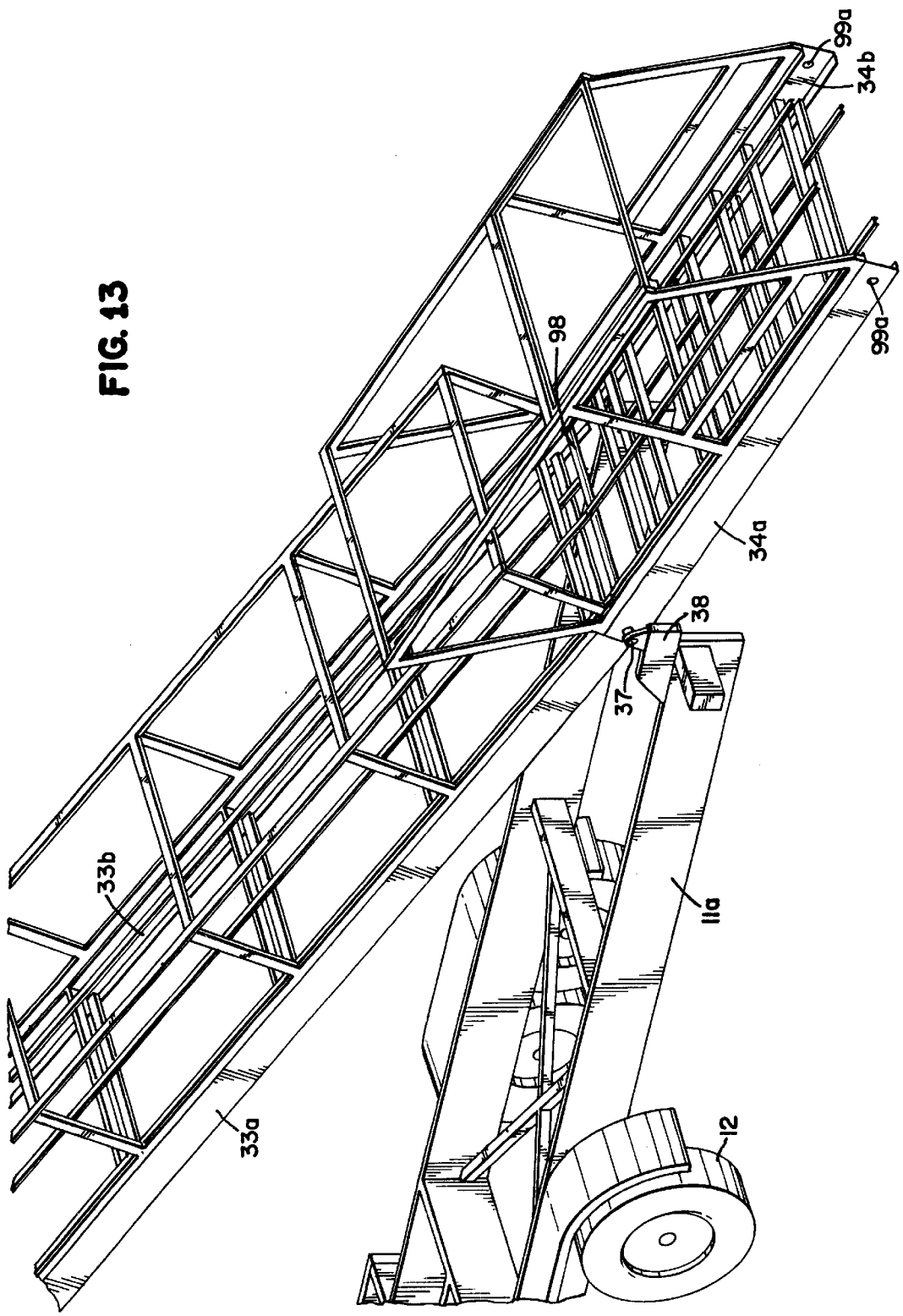
FIG. 13 is an enlarged view of the gathering end shown in FIG. 1.

The turkey loading apparatus also includes a transport conveyor, generally designated at 30. The metal chain 31 is shown only in FIG. 10 and has been removed for clarity purposes in the rest of the figures. However, the use of a metal chain conveyor is well known in the art, and the differences and construction between that well known in the art and that of the present invention will be discussed in sufficient detail to allow one skilled in the art to practice this invention. The transport conveyor 30 has a first segment generally designated at 32 pivotally connected to a second segment generally designated at 33. A third segment 34 is proximate the second segment 33 as will be discussed in more detail hereafter. The first segment 32 includes a left frame member 32a and a right frame member 32b interconnected by a plurality of supports 32c. An end roller 35 is mounted between the left frame member 32a and the right frame member 32b, by means well known in the art. The second segment 33 includes a left frame member 33a operatively connected to a right frame member 33b by cross members 33c. Another roller 36 is mounted between the left frame member 32a and right frame member 32b. In addition, the roller 36 is mounted between the left frame member 33a and the right frame member 33b. That is, the segments 32, 33 overlap and are pivotally connected by the roller 36. The third segment 34 of the transport conveyor 30 includes a left frame member 34a operatively connected to a right frame member 34b by cross members 34c. The lower end of the frame members 33a, 33b and the upper ends of the frame members 34a, 34b are secured to the base 11 by pins 37 suitably connected to a mounting block 38 on the left side and a similar mounting block 39 on the right side. There is therefore no lateral movement of the lower (back) end of the second segment 33 or the upper (forward) end of the third segment 34 laterally with respect to the base 11 as they are fixed in position. An end roller 99 is positioned and operatively connected to at the rear end of the third segment 34. The end roller 99 is positioned between opening 99a, shown in FIG. 13. An intermediate roller 98 is positioned between the segments 33 and 34 proximate the pins 37. The metal chain 31 rotates around the rollers 35, 36, 99 and are powered by a suitably hydraulic motor (not shown) or by other means well known in the art.

Housings are provided for the transport conveyor 30. The housing is generally designated at 40 and the framework 41, 42, 43 is shown in the FIG. 11. Generally, the housings 41, 42, 43 form three-sided structures and enclose the transport conveyor 30, with the metal chain 31 forming the fourth side. For clarity, the panels are not shown in the figures and only selected panels are shown exploded away, as it is well known in the art to enclose the conveyors in a turkey loading mechanism to prevent the turkeys from falling off of the conveyors. The framework for the housing 41 for the first segment 32 has a forward U-shaped frame 41a and a rear U-shaped frame 41b connected by top members 41c and bottom members 41d. Diagonal supports 41e are also provided. The housing framework 42 includes a front U-shaped member 42a connected to a rear U-shaped member 42b by top members 42c and bottom members 42d. The housing framework 43 includes a forward U-shaped member 43a connected to a rear U-shaped member 43b by top members 43c and bottom members 43d. Selective panels 44 shown exploded away and are shown as individual panels that fit between the segments of the frameworks 41, 42, 43. The entire frameworks 41–43 would be covered by panels 44. However, it is understood that larger panels could also be used. It is also appreciated that screening or open mesh could be utilized. However, it is preferred that the panels 44 be solid to create a darker environment to have a more calming effect on the turkeys. The panels 44 would thereby enclose the transport conveyor 30 and form the housing around the transport conveyor 30. The framework 42 is constructed with sufficient clearance to allow for the framework 42 to not interfere with either framework 41, 43 as the turkey loading apparatus is raised or lowered. Sliding or rolling members 45 are secured to the left frame member 32a, it being understood that identical sliding/rolling members 45 are secured to the right frame member 32b. The sliding members 45, as shown, are rollers 45 that are rotatably mounted to the frame members 32a, 32b. The roller 45 has a generally V-shaped central indentation portion 45a, whose function will be described more fully hereinafter.

Two rails 70, 71 are operatively connected to the base 20 and are used to guide and support the transport conveyor 30 and loading conveyor 50. The rails 70, 71 are mirror images of each other. The rails 70, 71 is secured to the members 21, 22 by suitable means which will be described hereafter. The rails 70, 71 are thereby secured to the base 20 and as the base 20 moves up and down the rails 70, 71 will move up and down. Additional mounting plates can be welded between the rails 70, 71 and members 21, 22 to further secure the two together. Spaced below the rail 70, 71 is an elongate bar 78, 79 that is secured to the rails 70, 71 by welding strips 76, 77. The top portion of the track bars 78, 79 will provide a track for the loading conveyor 50 as will be described more fully hereinafter.

Figure 9:
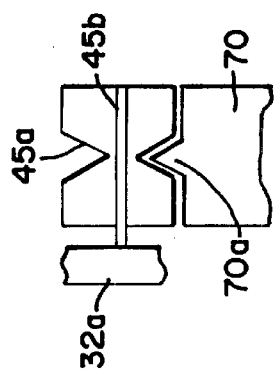
FIG. 9 is a cross-sectional view of the roller and top of the rail used in the loading apparatus shown in FIG. 1.

Referring the FIGS. 1 and 9, it can be seen that the rollers 45 rest on top of the rails 70, 71. The rails 70, 71 have an inverted V-shaped portion 70a in which the V-shaped indentation 45a fits. The roller 45 is mounted on a shaft 45b which is suitably mounted in the frame 32a, 32b. The first segment 32 of the transport conveyor 30 is therefore slidable on the top of the rails 70, 71. The rollers 45 are just one example of how the first segment 32 may be moved along the rails 70, 71, it being understood that other suitable sliding/mounting configurations may be utilized. The reason for the movement of the first segment 32 will be described in more detail hereafter.

Figure 3:
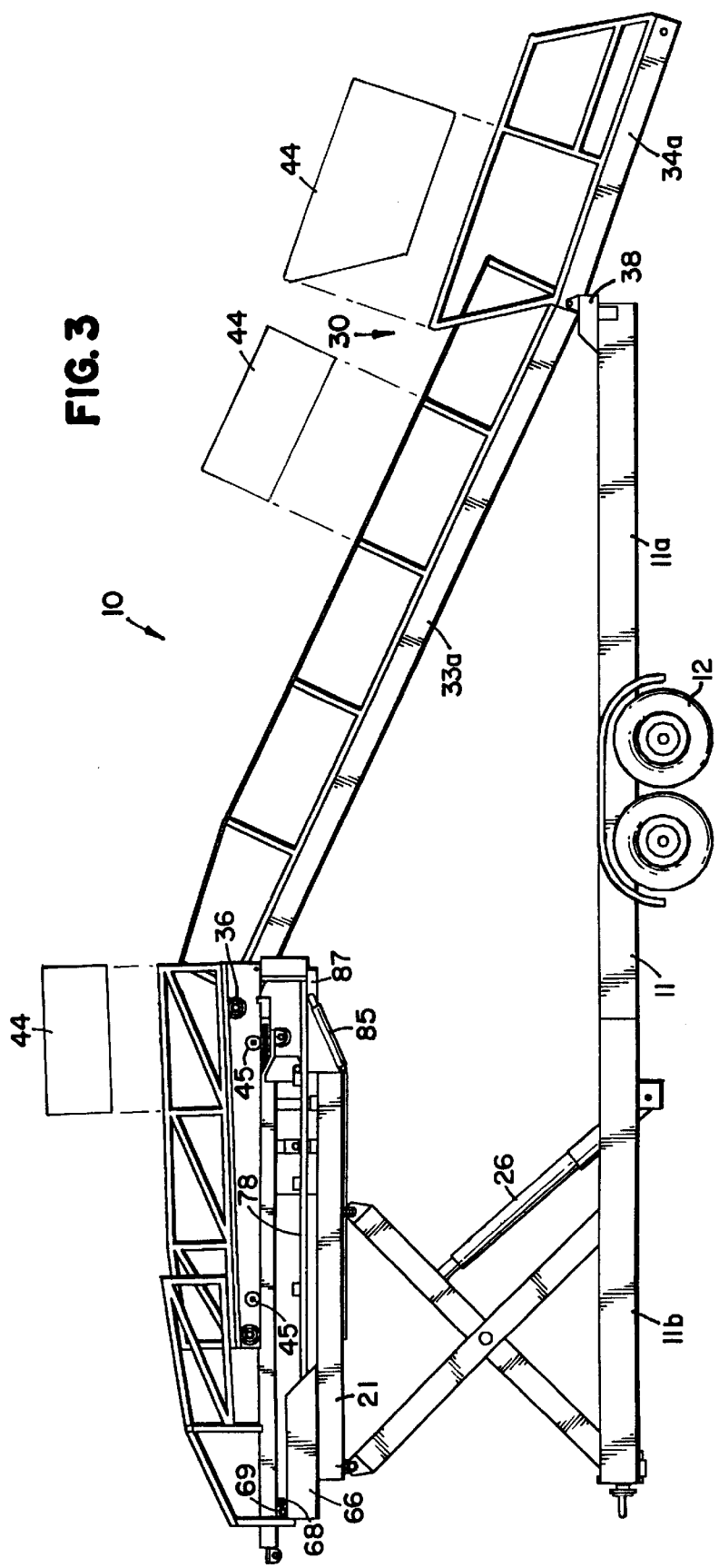
FIG. 3 is a left side elevational view of the loading apparatus shown in FIG. 1 with the loading conveyor retracted.
Figure 4:
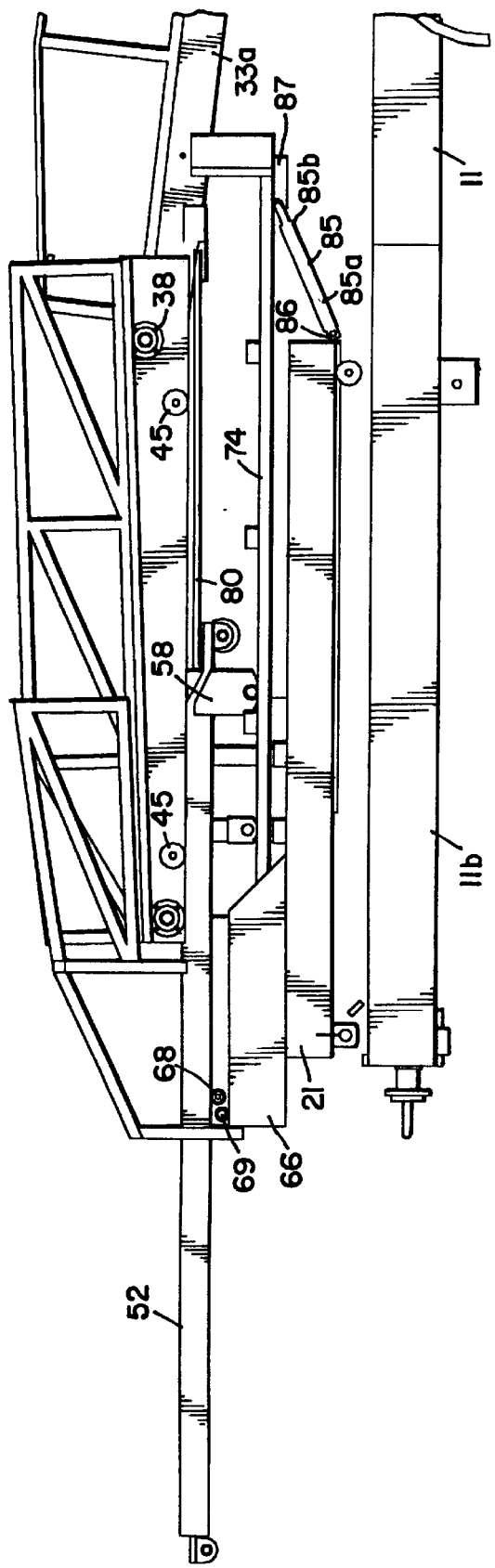
FIG. 4 is a partial left side view of the loading apparatus shown in FIG. 1, with the loading conveyor extended and the apparatus in a lower position.
Figure 5:
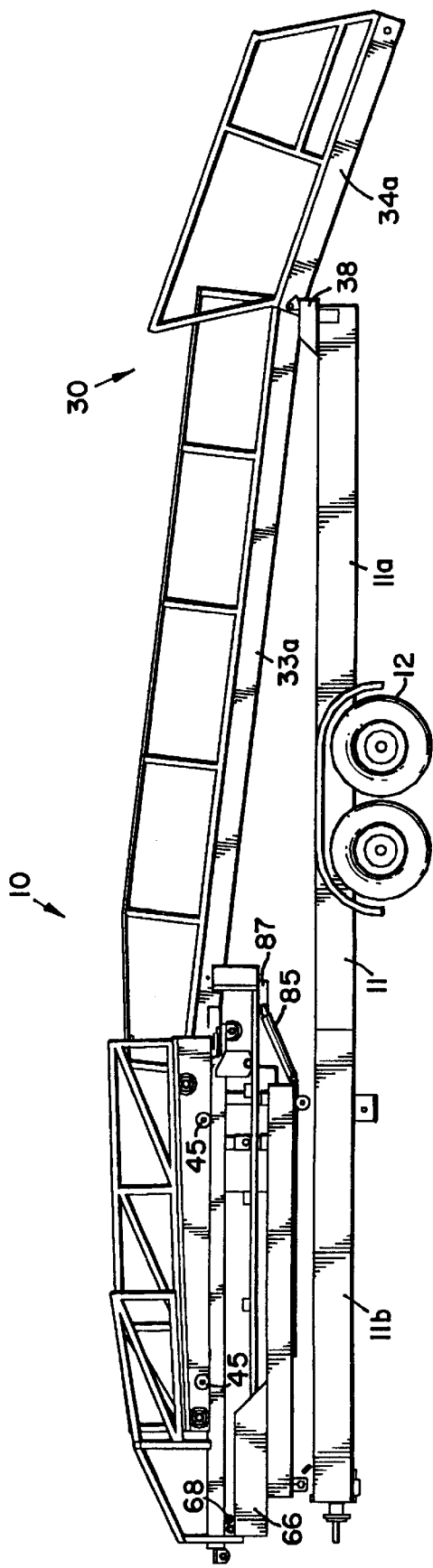
FIG. 5 is a left side elevational view of the loading apparatus shown in FIG. 1, with the loading conveyor retracted and the apparatus in a lower position.
Figure 6:
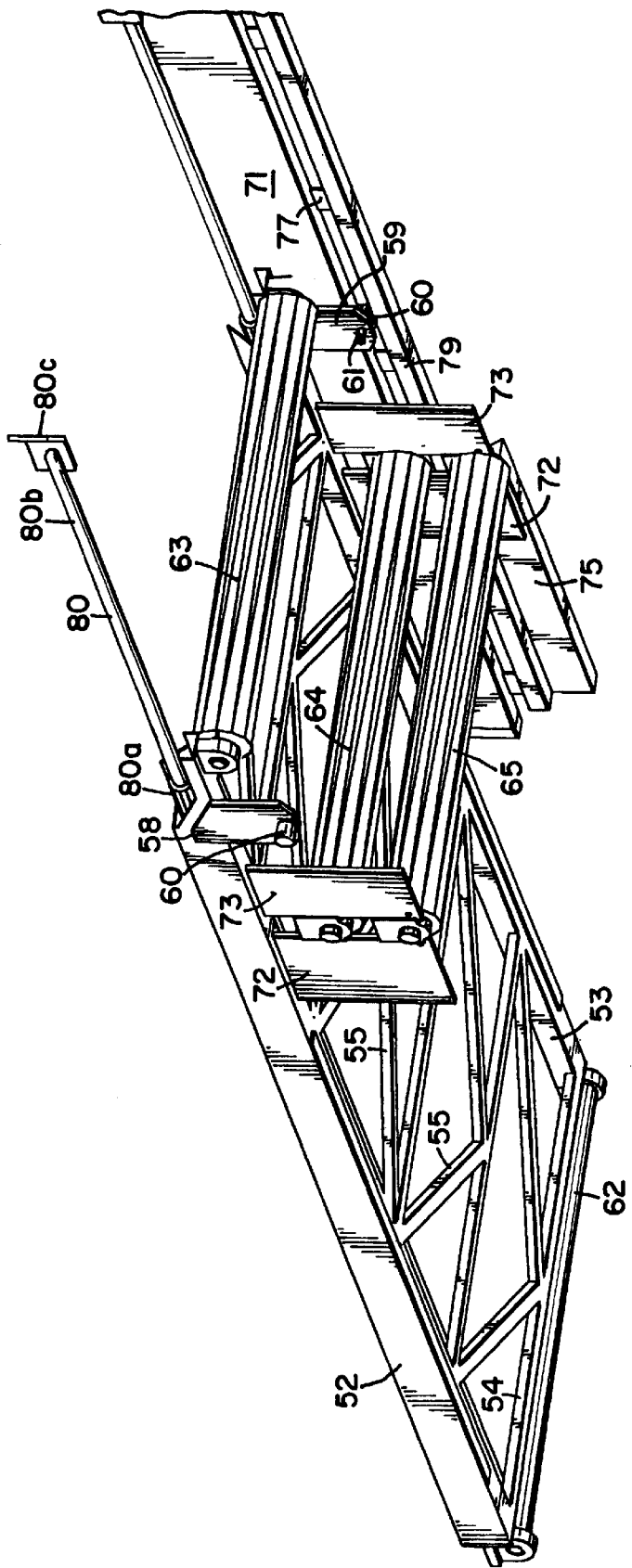
FIG. 6 is a perspective view, viewed generally from below, of a portion of the loading apparatus shown in FIG. 1.
Figure 7:
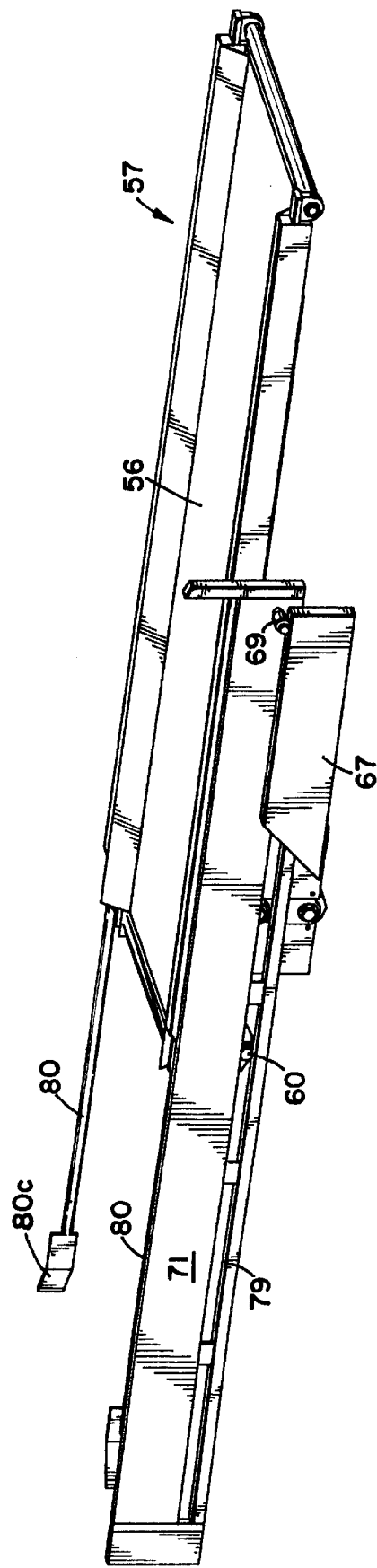
FIG. 7 is a perspective view, viewed generally from above, of a portion of the loading apparatus shown in FIG. 1.
Figure 8:
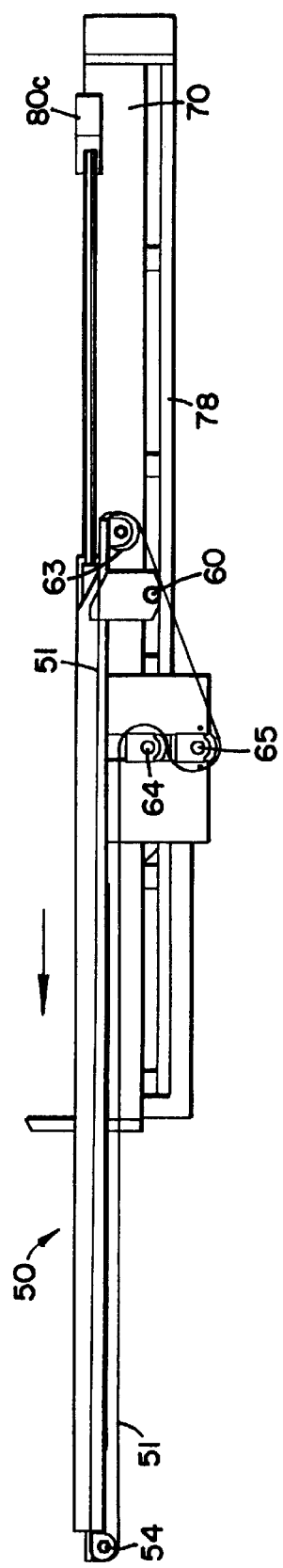
FIG. 8 is a side elevational view of the loading apparatus shown in FIG. 1, showing the loading conveyor belt layout.
Figure 12:
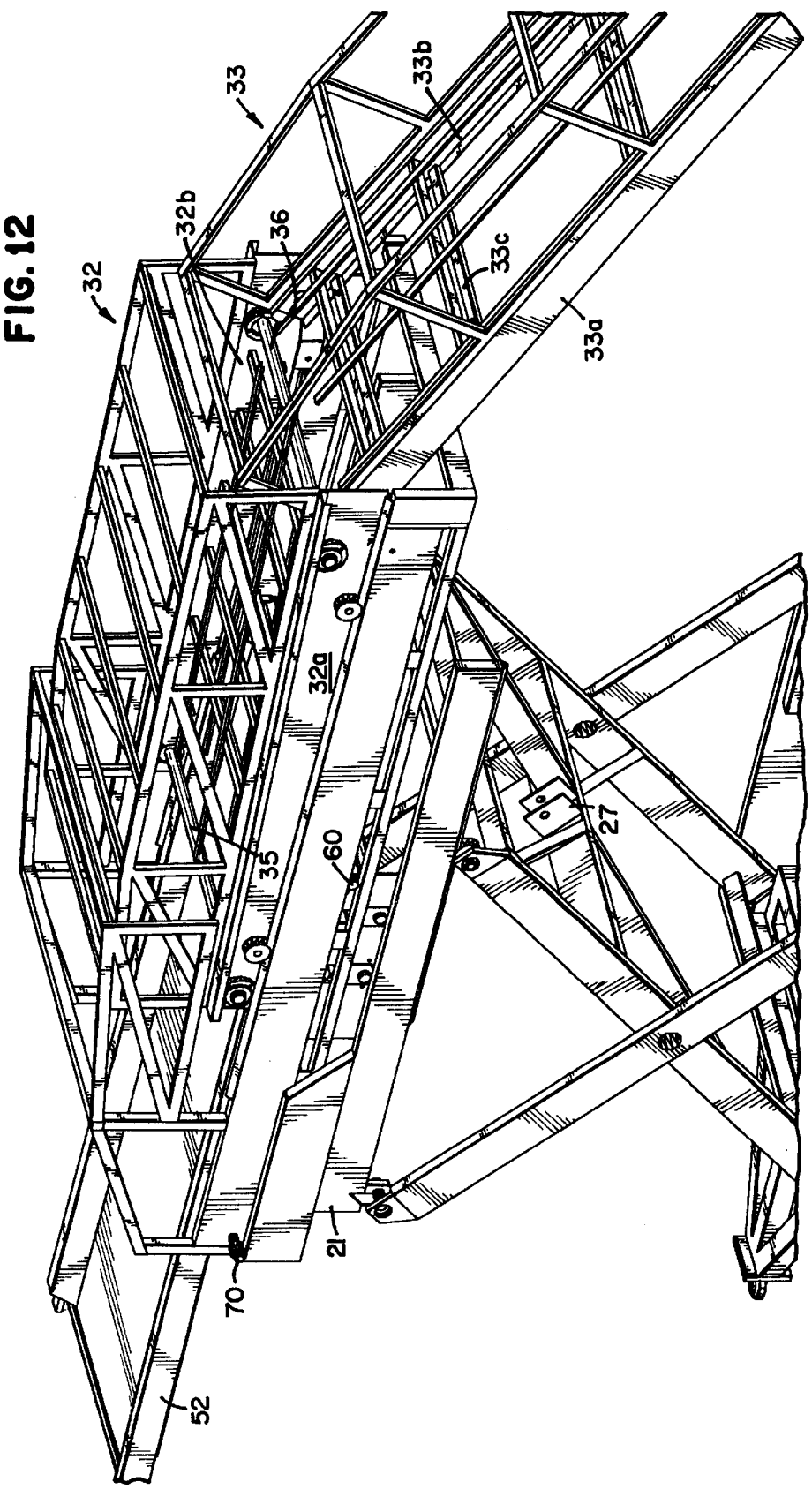
FIG. 12 is an enlarged view of the loading end shown in FIG. 1.

The loading conveyor 50 is shown without its belt 51 for clarity purposes. The belt 51 is shown schematically in FIG. 8 only. The loading conveyor 50 is carried by the rails 70, 71. Referring especially to FIGS. 1 and 6 through 8, the loading conveyor 50 includes a left side member 52 operatively connected to a right side member 53 by a front member 54 and a plurality of cross bracing 55. A metal bed 56 is secured to the top of the cross members 55 and forms a platform on top of which the belt 51 travels. The members 52–55 and pan 56 form the frame, generally designated at 57, of the loading conveyor 50. The frame 57 is mounted between the rails 70, 71 and is moveable between an extended and a retracted position. A first plate 58 is welded to the rear of the left frame 52 and a second plate 59 is welded to the right member 53. Rollers 60 are rotatably mounted in the plates 58, 59 by pins 61. Tubes 66, 67 are suitably mounted to the rails 70, 71 by suitable means such as welding. A roller 68 is mounted into inside of the rail 70. A similar roller is mounted to the rail 71. The rollers 68 are positioned such that the underneath portion of the frame 57 rests on the rollers 68 so as to provide support for the frame as it is being extended. The roller 68 is seen in FIGS. 3–5 in hidden lines as the rail 70 would prevent it from being seen when viewed from the outside. In FIGS. 11 and 12, roller 68 is seen since the rail 70 has been removed. A pivot pin 69 is operatively connected to the rails 70, 71 and rests on the top of the tube 66, 67. This provides for a connection between the rails 70, 71 and members 21, 22 as well as a mechanism of tilting the loading conveyor 50. The rails 70, 71 are secured to the members 21, 22 at the front end by pivot pins 69. At the rear end, the rails 70, 71 are secured to the members 21, 22 by hydraulic cylinders 85 (one on each side), which are only show in selected views. As seen in FIG. 4, the lower end 85a is connected to a bracket 86, which in turn is secured to the members 21, 22. The upper end 85b is secured to a bracket 87, which in turn is secured to the rails 70, 71. It is understood any suitable well known construction technique may be used to secure the hydraulic cylinder 85 between the members 20, 21 and the rails 70, 71. By extending or retracting the cylinders 85, the level of the rails 70, 71 is able to be changed. Four rollers 62–65 are operatively connected to the frame 57 to provide the driving force and guiding path for the belt 51. In viewing FIGS. 6 and 7, the rail 70 has been removed to better see the remaining components. The front roller 62 is suitably mounted to the front portion of the frame 57. A rear roller 63 is suitably mounted to the rear portion of the frame 57. Two drive rollers 64, 65 are suitably mounted between plates 72, 73 which are connected to the frame 57. As can be seen in FIG. 8, the belt 51 goes around the rear roller 63 and across the pan 56 to the front roller 62. The belt then continues over the top of drive roller 64 and then back between the drive rollers 64, 65 and finally around to the rear roller 63. The drive rollers are driven by a suitable motive force, such as a hydraulic motor (not shown).

Figure 2:
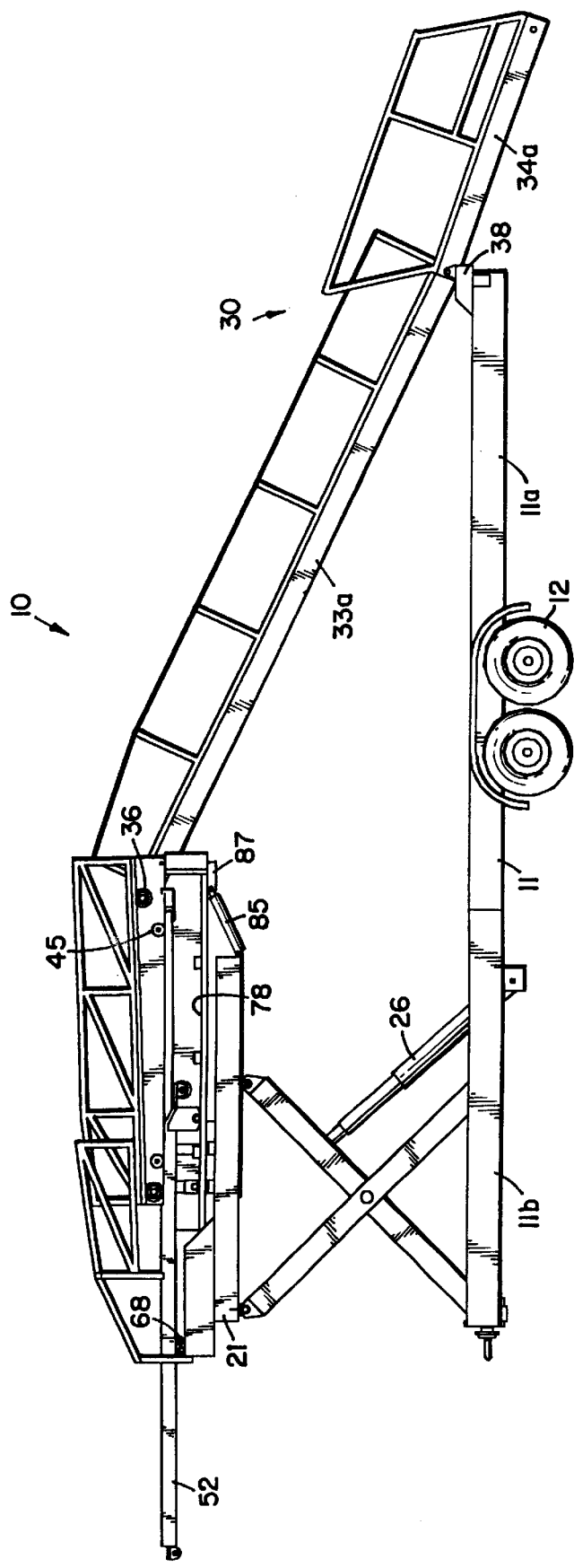
FIG. 2 is a left side elevational view of the turkey loading apparatus shown in FIG. 1, showing the loading conveyor extended.

The frame 57 of the loading conveyor 50 is moved from a retracted position as shown in FIGS. 3, 5 and 11 to an extended position as shown in FIGS. 1, 2 and 4. Two hydraulic cylinders 80 have a first end 80a secured to the frame 57 and a second end 80b attached to a plate 80c. The plate 80c in turn is secured by suitable means such as welding to the rails 70, 71. It is understood other means, well known in the art, could be used to move the conveyor frame 57.

A framework 91 is secured to the frame 57 of the loading conveyor 50. The framework 91 functions the same as the frameworks 41–43, that is it provides a framework for placing panels around the loading conveyor. The framework 91 has four posts 92 that are secured to the rails 70, 71. Side frames 93 are operatively connected to the rear post 92. The side frames 93 extend on the outside of the framework 41, thereby allowing for the passage of the frames 41 and 91 as the loading conveyor 50 moves to its extended position. It also allows for movement between the frameworks when the first segment 32 moves laterally on the rails 70, 71.

An operator platform (not shown) is typically attached to both sides of the front portion of the rails 70, 71 to allow for control of the turkey loading apparatus by the operators. However, it is well known in the art to have such operating platforms attached to turkey loading apparatuses, and therefore is not shown or described more fully here.

In operation, the turkey loading apparatus 10 is pulled up adjacent to a trailer having a plurality of coops. The trailer has coops are typically five or more coops in height, two coops in width and over eight coops in length. The side-by-side turkey coops have a separating wall that is able to be raised to allow for the loading conveyor 50 to be extended into the far coop and load the coops without the necessity of going on both sides of the trailer. Such coops are well known in the art. When the turkey loading apparatus 10 is in position, the loading conveyor 50 is in a retracted position and the lift mechanism 13 is adjusted to the desired height by movement of the hydraulic cylinder 26. The turkeys are positioned at that gathering end of the transport conveyor and the metal chain 31 is driven by a hydraulic motor (not shown) or other suitable means. The turkeys are then brought up by the metal chain 31 to the first segment 32 where the turkeys drop (only a few inches) on to the belt 51. The hydraulic cylinders 80 are then actuated and the loading conveyor 50 moves from its retracted position to an extended position. The rollers 60 move on top of the track bar 78, 79. The loading conveyor 50 extends at least four feet, preferably six feet and more preferably six and one-half feet underneath the transport conveyor. This allows for sufficient travel of the loading conveyor to extend into the second coop, through the first coop. It is not necessary to have the loading conveyor extend in length as the entire loading conveyor and frame moves. The turkeys continue to be dropped on to the loading conveyor as the loading conveyor moves to its extended position. Then, when in the fully extended position, the belt 51 is activated and the turkeys are rolled off of the belt 51. The frame 57 is then gradually retracted by the cylinders 80, with the belt 51 running, to deposit the turkeys in the coops. The first coop, or the coop closest to the trailer, is filled with turkeys after a sufficient amount of turkeys have been placed in the far or second coop. When in the retracted position, the loading conveyor 50 is adjacent the first coop. It can therefore be seen that the overhang of the loading conveyor 50, underneath the transport conveyor 30, allows for the loading conveyor 50 to be extended into the second coop by simply moving the frame 57 and thereby the rollers 62–65 and belt 51. It is not necessary to have a serpentine or extending length of a conveyor which is typical in the prior art.

Then, after both coops are filled, the next level of coops are filled. Another important aspect of the present invention, that is the pivoting of the transport conveyor 50 and the lateral movement of the first segment 32. In comparing FIGS. 3 and 5, it can be seen that the rollers 45 in FIG. 5 are positioned farther forward than in FIG. 3. The lifting mechanism is not shown in FIGS. 4 and 5. This is because as the lifting mechanism lowers the turkey loading apparatus, the first segment 32 pivots with respect to the second segment 33 and since the end of the second segment 33 is fixed laterally, the first segment 32 moves laterally to the left. This is important because in prior art turkey loading apparatuses, the pivoting took place at the gathering end. When this happened, the gathering end moved laterally, thereby always necessitating the readjustment of any apparatus used to herd or load the turkeys onto the gathering end of the loading conveyor 50. By having the gathering end fixed laterally, there is no need to adjust any such equipment with the present invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A turkey loading apparatus for loading turkeys in a coop on a trailer, the coop forming an enclosure for turkeys, comprising:
   a) a base having a first end and a second end;
   b) a transport conveyor operatively supported by the base, the transport conveyor having a gathering end and a transfer end;
   c) a lifting mechanism operatively connected to the base proximate the second end of the base;
   d) a longitudinal rail operatively connected to the lift mechanism, wherein the rail is moveable vertically;
   e) the transfer end of the transport conveyor supported by and longitudinally moveable on the rail and the transport conveyor, proximate the gathering end, operatively connected to and supported by the base;
   f) the transport conveyor having a first segment pivotally connected to a second segment, wherein when the longitudinal rail is lifted, the first segment pivots relative to the second segment and the transfer end moves longitudinally on the rail; and
   g) a loading conveyor operatively connected to the longitudinal rail and positioned below the transport conveyor, the loading conveyor moveable between a retracted position and an extended position, wherein turkeys are moved on the transport conveyor and dropped onto the loading conveyor, the loading conveyor being moved to its extended position and run to deposit the turkeys into the coop as the loading conveyor is being retracted.

2. The turkey loading apparatus of claim 1, further comprising wheels operatively connected to the base, wherein the turkey loading apparatus is transportable.

3. The turkey loading apparatus of claim 2, further comprising a leveling mechanism having a first end and a second end, the first end of the leveling mechanism operatively connected to lifting mechanism and a second end operatively connected to the rail.

4. The turkey loading apparatus of claim 3, further comprising a housing over the transport conveyor to contain the turkeys.

5. The turkey loading apparatus of claim 1, further comprising a first sliding member operatively connected to the first segment of the transport conveyor and a mating sliding member operatively connected to the rail.

6. The turkey loading apparatus of claim 5, wherein the first sliding member is a roller having a V-shaped protuberance and the mating sliding member is a top surface of the rail having a V-shape.

7. A turkey loading apparatus for loading turkeys in a coop on a trailer, the coop forming an enclosure for turkeys, comprising:
   a) a base having a first end and a second end;
   b) a transport conveyor operatively supported by the base, the transport conveyor having a gathering end and a transfer end;
   c) a lifting mechanism operatively connected to the base proximate the second end of the base;
   d) a longitudinal rail operatively connected to the lift mechanism, wherein the rail is moveable vertically;
   e) the transfer end of the transport conveyor supported by and longitudinally moveable on the rail and the transport conveyor, proximate the gathering end, operatively connected to and supported by the base; and
   f) a loading conveyor operatively connected to the longitudinal rail and positioned below the transport conveyor, the loading conveyor having a fixed length and moveable between a retracted position and an extended position, when in the retracted position there is at least four feet of the loading conveyor under the transport conveyor, wherein turkeys are moved on the transport conveyor and dropped onto the loading conveyor, the loading conveyor being moved to its extended position and run to deposit the turkeys into the coop as the loading conveyor is being retracted.

8. The turkey loading apparatus of claim 7, wherein there is at least six feet of the loading conveyor under the transport conveyor.

9. The turkey loading apparatus of claim 7, further comprising an air cylinder having a first end operatively connected to the loading conveyor and a second end operatively connected to the rail, wherein actuation of the air cylinder extends and retracts the loading conveyor.

10. The turkey loading apparatus of claim 7, further comprising wheels operatively connected to the base, wherein the turkey loading apparatus is transportable.

11. The turkey loading apparatus of claim 10, further comprising a leveling mechanism having a first end and a second end, the first end of the leveling mechanism operatively connected to lifting mechanism and a second end operatively connected to the rail.

12. The turkey loading apparatus of claim 11, further comprising a housing over the transport conveyor to contain the turkeys.

13. The turkey loading apparatus of claim 7, further comprising a first sliding member operatively connected to the first segment of the transport conveyor and a mating sliding member operatively connected to the rail.

14. The turkey loading apparatus of claim 13, wherein the first sliding member is a roller having a V-shaped protuberance and the mating sliding member is a top surface of the rail having a V-shape.

15. A turkey loading apparatus for loading turkeys in a coop on a trailer, the coop forming an enclosure for turkeys, comprising:
   a) a base having a first end and a second end;
   b) a transport conveyor operatively supported by the base, the transport conveyor having a gathering end and a transfer end;
   c) a lifting mechanism operatively connected to the base proximate the second end of the base;
   d) a longitudinal rail operatively connected to the lift mechanism, wherein the rail is moveable vertically;
   e) the transfer end of the transport conveyor supported by and longitudinally moveable on the rail and the transport conveyor, proximate the gathering end, operatively connected to and supported by the base;
   f) the transport conveyor having a first segment pivotally connected to a second segment, wherein when the longitudinal rail is lifted, the first segment pivots relative to the second segment and the transfer end moves longitudinally on the rail; and
   g) a loading conveyor operatively connected to the longitudinal rail and positioned below the transport conveyor, the loading conveyor having a fixed length and moveable between a retracted position and an extended position, when in the retracted position there is at least four feet of the loading conveyor under the transport conveyor, wherein turkeys are moved on the transport conveyor and dropped onto the loading conveyor, the loading conveyor being moved to its extended position and run to deposit the turkeys into the coop as the loading conveyor is being retracted.

16. The turkey loading apparatus of claim 15, wherein there is at least six feet of the loading conveyor under the transport conveyor.

17. The turkey loading apparatus of claim 15, further comprising an air cylinder having a first end operatively connected to the loading conveyor and a second end operatively connected to the rail, wherein actuation of the air cylinder extends and retracts the loading conveyor.

18. The turkey loading apparatus of claim 15, further comprising wheels operatively connected to the base, wherein the turkey loading apparatus is transportable.

19. The turkey loading apparatus of claim 18, further comprising a leveling mechanism having a first end and a second end, the first end of the leveling mechanism operatively connected to lifting mechanism and a second end operatively connected to the rail.

20. The turkey loading apparatus of claim 19, further comprising a housing over the transport conveyor to contain the turkeys.

21. The turkey loading apparatus of claim 15, further comprising a first sliding member operatively connected to the first segment of the transport conveyor and a mating sliding member operatively connected to the rail.

22. The turkey loading apparatus of claim 21, wherein the first sliding member is a roller having a V-shaped protuberance and the mating sliding member is a top surface of the rail having a V-shape.

23. A method of loading turkeys comprising:
   a) herding turkeys onto a transport conveyor;
   b) conveying the turkeys on the transport conveyor;
   c) dropping the turkeys from the transport conveyor onto a loading conveyor positioned below the transport conveyor;
   d) moving the loading conveyor into a coop on a trailer; and
   e) conveying turkeys off a forward end of the loading conveyor as the loading conveyor is being retracted.

24. The method of claim 23, further comprising the trailer having a second coop behind a first coop and extending the loading conveyor at least half way into the second coop thereby loading turkeys into both the second and first coops.

25. The method of claim 24, further comprising the transport conveyor having a first segment pivotally connected to a second segment and raising the loading conveyor from a first height to a second height and the second segment moves laterally, thereby keeping the first segment in a fixed lateral position.

* * * * *